March 11, 1958  E. V. COLLINS  2,826,130
HITCH ASSEMBLY FOR CONNECTING A FARM TRACTOR
WITH A GROUND WORKING FARM IMPLEMENT
Original Filed June 3, 1950  2 Sheets-Sheet 1
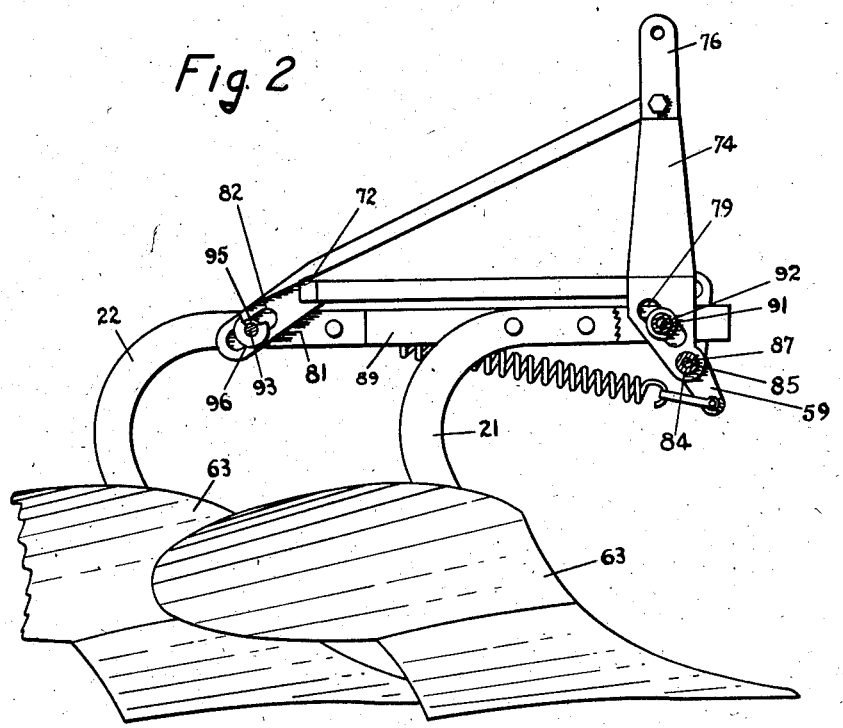
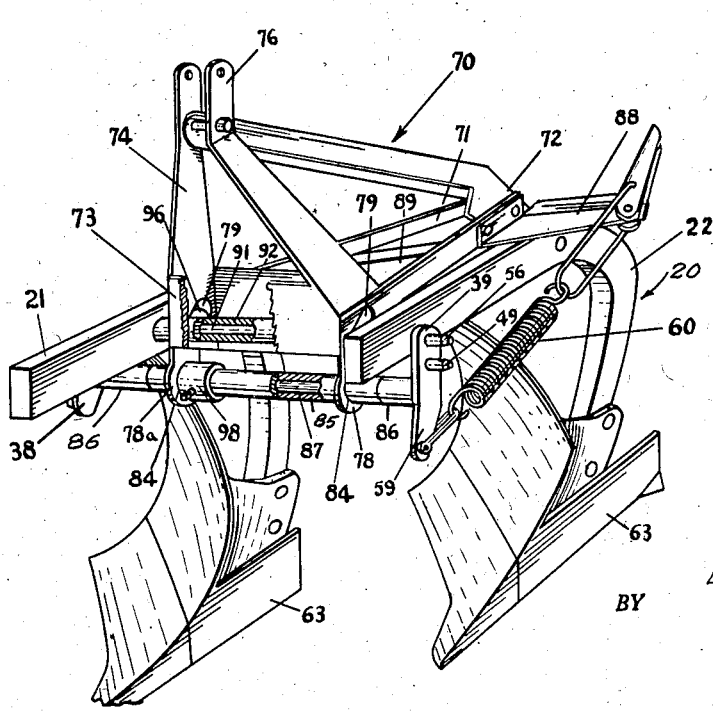
INVENTOR.
EDGAR V. COLLINS
BY March 11, 1958  E. V. COLLINS  2,826,130
HITCH ASSEMBLY FOR CONNECTING A FARM TRACTOR
WITH A GROUND WORKING FARM IMPLEMENT
Original Filed June 3, 1950  2 Sheets-Sheet 2
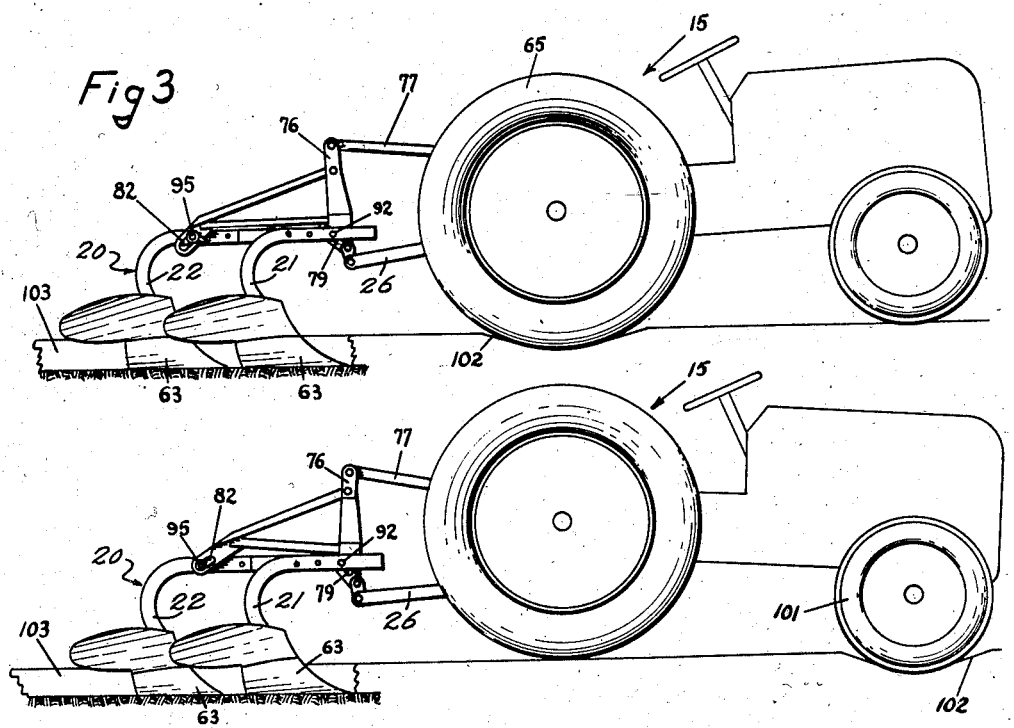
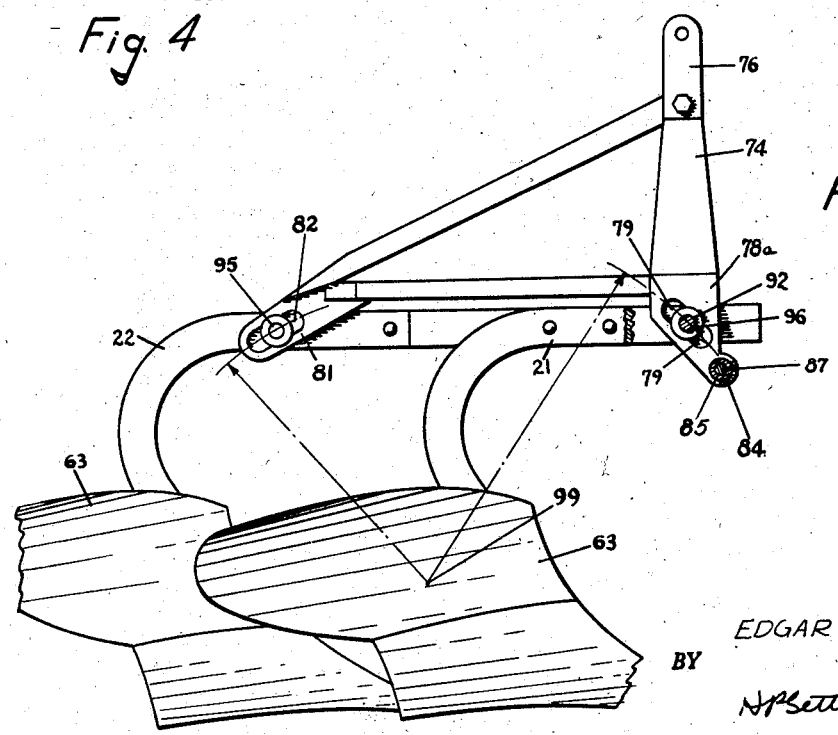
INVENTOR.
EDGAR V. COLLINS
BY United States Patent Office 2,826,130
Patented Mar. 11, 1958

2,826,130

HITCH ASSEMBLY FOR CONNECTING A FARM TRACTOR WITH A GROUND WORKING FARM IMPLEMENT

Edgar V. Collins, Ames, Iowa

Original application June 3, 1950, Serial No. 165,922, now Patent No. 2,653,531, dated September 29, 1953. Divided and this application July 1, 1953, Serial No. 365,369

5 Claims. (Cl. 97—46.93)

This application is a division of my earlier filed pending application, Serial No. 165,922, filed June 3, 1950, now Patent No. 2,653,531.

This invention relates generally to tractor hitches and in particular to a hitch for connecting a farm tractor with a ground working farm implement such as a plow, cultivator, lister, and the like.

In the general use of a ground working farm implement, such as a plow, for example, appreciable difficulty is encountered in contour plowing requiring short radius turns, due to the inability of the plow to follow the tractor in the turn. This objection is generally the result of the side thrust of the plow acting to limit the effective turning action of the tractor steering wheels, so that the side thrust takes the steering of the tractor away from the tractor steering wheels in a short turn. In other words, after the tractor has been turned to a certain point, any further steering action is ineffective to accomplish any sharper turning radius due to the steering wheels being merely pushed or skidded in a turn having a radius greater than that called for by the turned position of the steering wheels. Further evidence of this condition is found in the fact that the width of the cut made by the plow in the turn, is of a different width relative to the cut made by the plow during the straight advance of the tractor.

It is an object of this invention, therefore, to provide for an improved tractor hitch.

A further object of this invention is to provide a tractor hitch for a ground working implement which maintains a substantially uniform width of cut in both a straight line and short turn operation of the tractor.

Another object of this invention is to provide a tractor hitch for a plow capable of controlling the action of the plow so as to maintain the depth and width of the plow cut substantially uniform for an operation of the tractor in an arcuate path over an uneven or irregular ground surface.

Another object of this invention is to provide a hitch for connecting a plow with a tractor which is capable of controlling the suction of the plow so that the depth of the furrow being cut by the plow is substantially uniform for a travel of the tractor over an uneven ground surface.

Another object of this invention is to provide a hitch for connecting a plow with a tractor such that a part of the usual side thrust on the land side of the plow is transferred to the tractor wheels, whereby to permit a plowing operation within a shorter turning radius than has, so far as is known, been possible heretofore.

Further objects, features, and advantages of this invention will become apparent from the following description when taken in connection with the accompanying drawing in which:

Fig. 1 is a perspective view of the plow hitch of this invention with certain parts broken away for the purpose of clarity;

Fig. 2 is a side elevational view of the plow hitch shown in Fig. 1;

Figs. 3 and 4 are diagramatic side elevational views of the plow hitch of Fig. 1 shown in assembled relation with a tractor; and Fig. 5 is a side elevational view illustrated similarly to Fig. 2.

With reference to the drawings the hitch of this invention is illustrated in Fig. 3 in assembled relation with a tractor, designated generally as 15, and a plow structure, designated generally as 20 including a pair of interconnected plow beams 21 and 22 and an upright frame 74.

The tractor illustrated is a Ford, equipped with a hydraulic power unit of a well known type, as shown in my U. S. Patent 2,653,531, and having a pair of draft arms 26 with their front ends swivelly connected to opposite sides of the tractor differential housing. Lift links (not shown) are connected with the draft arms 26 and with a pair of rock arms (not shown) which are actuated, on operation of the power unit, to lift the draft arms 26 whereby to raise and lower the plow structure 20 relative to the ground. A link 77 is pivoted at one end to a bell crank (not shown) which is carried at the rear end of the tractor and forms part of the power lift, and at its opposite or rear end to the upright frame 74 on the plow structure 20. The bell crank is operatively associated with a valve mechanism of the power lift so that when the draft on the plow or farm implement varies tending to tilt the implement toward the tractor, the power unit is actuated to raise the plow structure from the ground.

The hydraulic power lift generally discussed above is well known commercially and except for the utilization of the draft arms 26 forms no part of the present invention.

The hitch of this invention (Figs. 1 and 2) includes a rock shaft 87 which is carried in a tubular bearing 85. Secured, as by welding, to opposite ends of the rock shaft 87 are a pair of rock arms 38 and 39 which are relatively positioned so as to extend laterally outwardly in opposite directions from the rock shaft 87. Located between each rock arm 38 and 39 and an adjacent end of the tubular bearing 85 is a spacing collar 86.

With reference to Fig. 1 the hitch is shown as including what will be termed a hanger structure 70 having a triangular horizontal frame 71 with its apex 72 at the rear end thereof and its base member 73 at the front end thereof. An upright frame 74 extended upwardly from the base 73 has its top end 76 pivotally connected, as shown in Fig. 3, with a top link 77 which is operatively associated with the Ford power lift or unit.

The base member 73 is provided at its opposite ends with a pair of downwardly projected bearing straps or arms 78 and 78a (Fig. 1) which are formed with transversely aligned arcuate slots 79 for a purpose which will appear later. As shown in Figs. 2 and 5, the apex 72 of the frame 71 terminates in a downwardly and rearwardly projected bearing arm extension 81 that is formed with an arcuate slot 82 which is reversely inclined relative to the aligned slots 79 formed in the bearing arms 78 and 78a. The free or lower ends of the front bearing arms 78 and 78a are formed with transversely aligned holes 84 for rotatably receiving the tubular bearing 85 (Fig. 1).

As previously mentioned, the front ends of the draft arms 26 are swiveled to opposite sides of the tractor differential housing (not shown) such that the swiveled connections are in linear alignment transversely of the tractor 15.

Further, one of the draft arms 26 is pivotally connected to the free end of the rock arm 38, and the other draft arm 26 is pivoted on a pin 49 provided on the rock arm 39. A stabilizing arm (not shown, see U. S. Patent 2,653,531) has its rear end pivoted on the pin 56 of the rock arm 39, and its front end swivelly connected on the tractor rear axle (not shown) at a position spaced outwardly from the draft arm 26 which is connected with the rock arm 39.

A tension spring 60 (Fig. 2) has its front end connected to an extension 59 of the rock arm 39 and its rear end connected to a bracket 88 projected laterally from the apex 72 of the horizontal frame 71 of the hanger structure 70. The plow beams 21 and 22 are interconnected adjacent their rear ends by a brace member 89 and adjacent their front ends by a tie rod 91 (Figs. 1 and 2). Mounted about the tie rod 91 is a roller tube 92. When the rock shaft 87 is assembled with the beams 21 and 22, the rock arm 39 is positioned outwardly from the beam 22, while the rock arm 38 is positioned outwardly from the beam 21.

As best appears in Fig. 1 the plow beams 21 and 22 are arranged at opposite sides of the hanger structure 70 with the tie rod 91 and roller tube 92 extended through the arcuate slots 79 formed in the bearing arms 78 and 78a. Positioned within the arcuate slot 82, formed in the rear extension 81 of the frame 71, is a roller 95 which is carried on a stub shaft 93 mounted on the plow beam 22 at a position adjacent the rear end thereof. Each of the rollers 92 and 95 has associated thrust washers 96 which are engageable with the left sides of the arm 78a and rear extension arm 81, respectively, as viewed in Fig. 1, or with the front sides of these arms as viewed in Fig. 2. Likewise, a thrust collar 98 is fixed to the tubular bearing 86 for engagement with the right side of the arm 78a as viewed in Fig. 1. This arrangement of the thrust washers 96 and thrust collar 98 counteracts the action of the spring 60 to pull the plows 63 toward the left, as viewed in Fig. 1.

The operation of the plow hitch of Fig. 1 for accomplishing a short radius turn of the tractor during a plowing operation, with a maintaining of a substantially uniform furrow width, is similar in all respects to such operation described in my Patent 2,653,531, so that a description of this operation is believed to be unnecessary.

In the operation of the hitch shown in Fig. 1 for controlling the suction action of the plows 63 for a travel of the tractor over an uneven ground surface it will be noticed from Figs. 2 and 5 that the arcuate slots 79 and 82 are reversely inclined, namely, the front slots 79 are inclined upwardly and rearwardly, while the rear slot 82 is inclined downwardly, and rearwardly. The inclination of the slots 79 and 82 are empirically developed on the theory that the hypothetical point of application of the pulling force on the plows 63 for a straight line pull without any suction action, takes place at the point indicated at 99, in Fig. 5, located centrally between the plows 63 and on the line of pull and forwardly of the center of resistance and constituting a common center for the slots 79 and 82.

The slot 82 in one embodiment of the invention, is formed on a radius of twenty-four and fixe-sixteenths inches, while the slots 79 are formed on a radius of twenty-three inches. In this embodiment the point 99 is located seventeen and one-half inches downwardly from the lower side of the horizontal frame 71.

In the operation of the depth or suction control for the plows 63, when the tractor 15 is traveling over level ground the rollers 92 and 95 are generally located substantially intermediate the ends of their respective slots 79 and 82 as shown in Fig. 5. Should the tractor front wheels 101 (Fig. 4) drop within a depression, indicated at 102, the frame 70 is moved clockwise relative to a transverse axis through the point 99 so that the roller 95 is located at the lower end of the slot 82 and the roller 92 at the upper ends of the slots 79 whereby the suction of the plows 63 remains unchanged to thus maintain the depth of the furrow, indicated at 103, uniform. In other words, the frame 70 is moved relative to the plows.

When the tractor rear wheels 65 drop into the depression 102, as illustrated in Fig. 3, the frame 70 is rotated in a counter-clockwise direction about a transverse axis through the point 99 so that the roller 95 takes a position at the upper end of the slot 82 and the roller 92 a position at the lower ends of the slots 79, with this action again resulting in no change in the suction action of the plows 63.

This movement of the frame 70 relative to the plows eliminates any stepping or chattering action of the plows 63 by acting to maintain the plows in adjusted suction positions and against any tipping movement in response to a travel of the tractor over uneven ground surfaces.

Although the invention has been described with specific reference to a plow, it is to be understood that it can be used with any farm implement of trailing type having a ground working tool thereon, such as a planter, cultivator, lister or disc.

It is to be further understood that although the invention has been described with respect to a preferred embodiment thereof, it is not to be so limited since changes can be made therein which are within the full intended scope of this invention as defined by the appended claims.

I claim:

1. In combination with a ground working implement having a main frame and adapted to be pulled by a tractor, a hanger structure for said frame supported on the tractor at a position rearwardly therefrom, with said hanger being formed at its opposite ends with reversely inclined longitudinally extended arcuate slots, transverse shaft portions on said frame arranged within said slots to support said frame for an up and down swinging movement relative to said hanger structure, a transversely extending cross-shaft on said hanger structure, and a pair of draft arms operatively connected to the opposing ends of said cross-shaft and to said tractor.

2. In a plow for attachment to vertically spaced tractor hitch links, a plow beam, a plow bottom carried by said beam, a hanger structure for said beam attachable to said hitch links, said hanger structure having longitudinally spaced arcuate slots struck about a center of curvature located at the hypothetical pull point of said plow, and means on said beam journalled in said slots, respectively, accommodating tilting movement of said beam and bottom relative to said hanger structure about the hypothetical plow pull point to allow variations in the position of said beam without correspondingly varying the suction of the plow bottom.

3. For use with a tractor having a trailing power liftable draft link, an implement comprising a hanger frame attached to the trailing end of said draft link for vertical movement therewith, an implement frame having ground-engaging parts operatively rigid therewith and having a theoretical center of pull located generally beneath said hanger frame, and lost motion connection means joining said hanger frame and said implement frame accommodating movement of said implement frame and ground-engaging parts about said theoretical center of pull relative to the hanger frame, said connection means being effective to elevate said implement frame with said hanger frame upon power lifting of said draft link.

4. A plow for use with a tractor having a pair of lower, laterally spaced, power-liftable, trailing draft links and a trailing top link laterally intermediate said draft links, a hitch frame having laterally and vertically spaced portions attachable to said draft links and said top link for vertical movement therewith upon power lifting of said links, a plow frame having a plow bottom rigid therewith, said plow frame being movable independently of said hitch frame about an effective pull point located in the vicinity of said plow bottom, said hitch frame having a plurality of longitudinally spaced arcuate slots therein, said slots being concentric about said effective pull point, and transverse pivot elements on said plow frame movable in said slots to accommodate said independent movement of said plow frame, which independent movement is limited by the extent of said slots to insure concurrent lifting of said frames upon power lifting of said draft links.

5. A plow for use with a tractor having a pair of lower, laterally spaced, power-liftable, trailing draft links and trailing top link laterally intermediate said draft links, a hitch frame having laterally and vertically spaced portions attachable to said draft links and said top link for vertical movement therewith upon power lifting of said links, a plow frame having a plow bottom rigid therewith, said hitch frame and said plow frame having interengaging slot and pin connection means accommodating movement of said plow frame independently of said hitch frame about an effective pull point located in the vicinity of said plow bottom, said slots being concentric about said effective pull point, and said pin means being movable in said slots to accommodate such independent movement and being bottomed in said slots to limit said independent movement upon power lifting of said draft links to elevate the plow.

References Cited in the file of this patent

UNITED STATES PATENTS

| | | |
|---|---|---|
| 1,780,503 | Paul | Nov. 4, 1930 |
| 1,940,061 | Paul | Dec. 19, 1933 |
| 2,320,141 | Kott | May 25, 1943 |
| 2,333,837 | Wibbels | Nov. 9, 1943 |
| 2,346,757 | Horner | Apr. 18, 1944 |
| 2,455,727 | Bunting | Dec. 7, 1948 |
| 2,577,002 | Corl et al. | Dec. 4, 1951 |
| 2,621,575 | Berg | Dec. 16, 1952 |